United States Patent Office 2,766,579
Patented Oct. 16, 1956

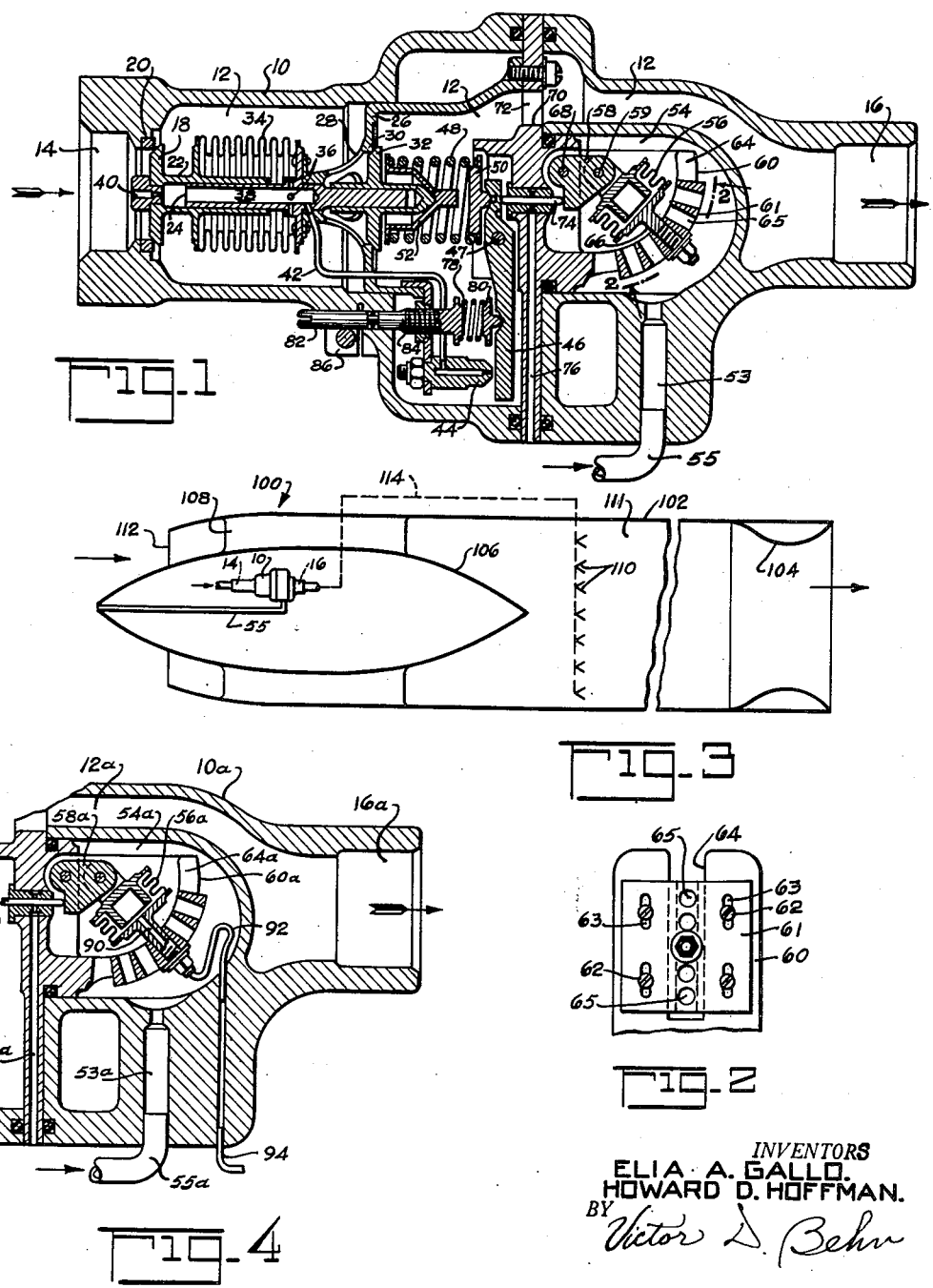

2,766,579

FLUID FLOW REGULATING MECHANISM RESPONSIVE TO A CONTROL PRESSURE

Elia A. Gallo, Englewood, and Howard D. Hoffman, Fair Lawn, N. J., assignors to Curtiss-Wright Corporation, a corporation of Delaware Application May 6, 1952, Serial No. 286,364

15 Claims. (Cl. 60—35.6)

This invention relates to flow regulating apparatus and is particularly directed to flow regulating apparatus which regulates the flow of a fluid in accordance with changes in a control pressure.

An object of the present invention comprises the provision of a novel and simple fluid flow regulating apparatus which regulates the flow of a fluid so that said flow is a predetermined function of a control fluid pressure and is independent of changes in the pressure of the fluid being regulated. A still further object of the invention comprises the provision of such a fluid regulating apparatus which maintains the flow of a fluid proportional to the magnitude of a control fluid pressure.

Other objects of the invention will become apparent upon reading the annexed detailed description in connection with the drawing in which:

Fig. 1 is an axial sectional view through a valve embodying the invention;

Fig. 2 is a view taken along line 2—2 of Fig. 1;

Fig. 3 is a schematic view of a jet engine embodying the invention;

Fig. 4 is a sectional view illustrating a slightly modified construction of a portion of Fig. 1.

Figure 5:
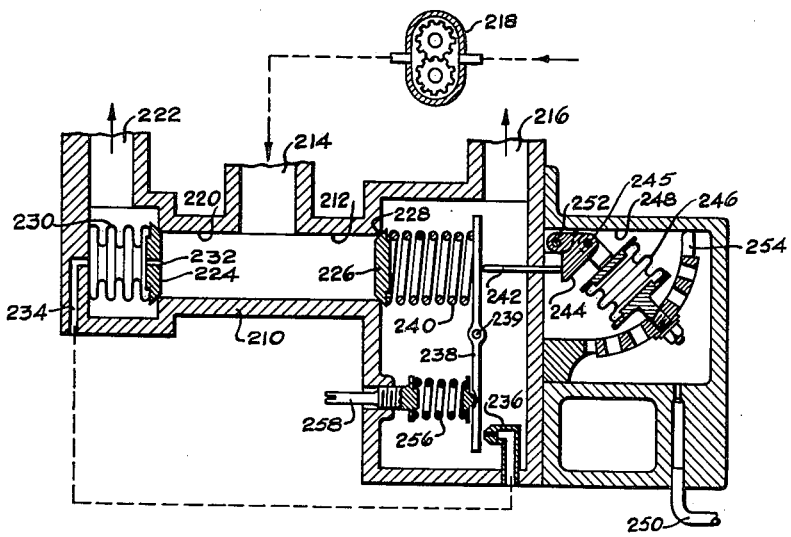
Fig. 5 is a view similar to Fig. 1 but illustrating a modified construction.

It has been determined that, with a conventional jet engine air inlet and for at least a limited range of flight speed, the mass air flow into the engine is substantially proportional to the impact pressure of the entering air relative to said engine. Accordingly, under these conditions a predetermined fuel-air ratio of the engine combustion mixture can be maintained by regulating the fuel flow to the engine so that said fuel flow is proportional to the impact pressure. Thus the invention has been designed for use in connection with an aircraft jet engine for regulating the rate of fuel supply to the engine in accordance with changes in a pressure proportional to the impact pressure of the surrounding airstream relative to the aircraft. As will appear, however, the invention is not limited to this specific use.

Referring first to Fig. 1 of the drawing, the fluid flow regulator comprises a housing 10 having a fluid passage 12 therethrough with a fluid inlet opening 14 and a fluid outlet opening 16. A main valve 18 is movable to regulate the rate of fluid flow through the passage 12. As illustrated, said valve 18 is a poppet-type valve and is movable axially toward and away from an annular valve seat 20 to decrease and increase respectively the flow through the passage 12. The valve 18 has a hollow hub-portion or sleeve 22 which extends in a downstream direction and is slidable on a fixed hollow stem 24 which in turn is supported from the housing by partition member 26 extending across the passage 12 downstream of the valve 18. The partition member 26 has an upstream portion with openings 28 therethrough and downstream therefrom said partition member forms an annular valve seat 30 for a poppet-type valve 32. The valve 32 has a hollow hub portion which is slidably mounted on a downstream extension of the stem 24. Thus the valve 32 is in series with and is disposed downstream of the valve 18.

An elastic bellows 34 has one end secured to said housing partition member 26 and has its other end secured to a flange on the sleeve 22 of the valve 18. Holes 36 provide communication between the interior of the bellows 34 and a passageway 38 including the interior of the sleeve 22 and hollow portion of the stem 24. The upstream end of said passageway 38 is in communication with the fluid inlet 14 upstream of the valve 18 through a restricted orifice member 40 and the downstream end of said passage includes a duct 42 terminating in a restricted discharge nozzle 44. The nozzle 44 discharges fluid flowing therethrough into the passage 12 downstream of the valve 32.

A lever 46 is pivotally mounted at 47 in the fluid passage 12 with one end of said lever overlying the discharge end of the nozzle 44 to act as a fluid baffle therefor so that the fluid flow resistance of the nozzle 44 varies with pivotal movements of said lever. A compression spring 48 is interposed between the lever 46 and the valve 32 for urging the lever in a direction for closing the nozzle 44 and urging said valve 32 in a valve closing direction. Thus one end of the spring 48 bears against a washer 50 which in turn bears against the lever 46 and the other end of said spring bears against a cup-shaped washer 52, the bottom of which bears against the hub of the valve 32.

A chamber 54 is formed in the housing 10 out of communication with the passage 12. A fluid under pressure is supplied to the chamber 54 through a passage 53 and duct 55 for controlling the rate of fluid flow through the passage 12. A sealed and at least partially evacuated bellows-type flexible diaphragm 56 is disposed in the chamber 54. One end of the bellows 56 is pivotally connected to one end of a bellcrank lever 58 at 59 and the other end of said bellows is adjustably anchored to a fixed arm 60. The arm 60 has the shape of a cylindrical arc with the center of said arc on the axis of the pivotal connection 59 of the bellows 56 to the lever 58. A plate 61 is adjustably secured to the arm 60 by screws 62, each screw 62 extending through an elongate slot 63 in the plate 61 and being threadedly secured to the arm 60. The plate 61 has a flange fitted between the side walls of an elongate slot 64 in arm 60, said flange having holes 65 therethrough. The adjacent end of the bellows 56 has a stem 66 extending through the slot 64 and one of the holes 65. A nut 67 is threaded on the end of the stem 66, said nut being tightened against the fluid pressure force acting to compress the bellows 56.

Selection of the desired hole 65 for the bellows stem 66 provides a rough adjustment of the angular position of the bellows 56 about its pivot axis 59. A fine adjustment of this angular position of the bellows 56 can then be obtained by shifting the plate 61 as provided for by the elongate slots 63.

The bellcrank lever 58 is pivotally supported intermediate its ends at 68 on a partition member 70 extending across the housing 10. The partition member 70 is provided with one or more openings 72 for flow of fluid therethrough along the passage 12 to the housing fluid outlet 16. The other end of the lever 58 engages a pin 74 which slidably extends through the partition member 70 into engagement with the lever 46 such that the fluid pressure force on the bellows 56 acts against the lever 46 through the bellcrank lever 58 and pin 74, to oppose the force of the spring 48 on the lever 46. In order to prevent leakage of fluid from the passage 12 into the chamber 54 along the pin 74, the intermediate portion of said pin is in communication with a vent passage 76.

A compression spring 78 also acts against the lever

46. One end of the spring 78 engages a washer 80 bearing against the lever 46 and the other end of said spring bears against the end of a screw 82 which is adjustably anchored to the housing 10 by threads 84 and a split-type clamp 86.

With the aforedescribed construction, the valve 18 is movable to regulate the rate of flow of fluid through the passage 12 while the valve 32 is movable against the spring 48 to provide a spring force which is a measure of said rate of flow. The valve 18 is urged in an opening direction by the fluid pressure in the passage 12 upstream of said valve. The elasticity of the flexible wall of the bellows 34 provides a spring force urging the valve 18 toward its closed position. In addition the fluid pressure within the bellows 34 urges the valve 18 toward its closed position so that opening and closing movements of said valve are controlled by variations of the pressure in the bellows 34. The pressure in the bellows 34 increases and decreases with increase and decrease respectively, of the fluid flow resistance of the nozzle 44. The lever 46 by its movements toward and away from the nozzle 44 respectively increases and decreases the flow resistance of said nozzle whereby the position of the regulating valve 18 and therefore the rate of fluid flow through the passage 12 is controlled by movements of said lever.

The range of movement of the lever 46 between its nozzle full open and nozzle full closed positions is negligible compared to the range of movement of the valve 32. Accordingly, variations in the force exerted by the spring 48 against the lever 46 are proportional to opening and closing movements of the valve 32. The valve 32 is urged in an opening direction against the force of the spring 48 by a fluid pressure force produced by the fluid pressure drop thereacross resulting from the fluid flowing through the passage 12 past said valve. Accordingly, the extent to which the valve 32 is open is a measure of the mass flow rate of the fluid through the passage 12. In fact it has been found that, over a limited flow range and with a poppet-type valve 32 having a conical seat engaging face, the mass rate of fluid flow past said valve is a substantially linear function of the extent to which the valve is open. That is, a graph or plot, on rectangular coordinates, of the mass rate of fluid flow through the passage 12 against the axial displacement of the valve 32 from its closed position is substantially a straight line over a limited flow range. For example, with the valve seat 30 having a diameter of approximately 1.25 inches and with the face of the valve 32 making an angle of 45° (as illustrated) to the valve axis, said graph is approximately a straight line for jet engine liquid fuel in a flow range of 5,000 to 50,000 pounds per hour. By changing the inclination of the valve face to the valve axis the flow range within which said straight line relation exists can be varied. Thus with the same valve seat 30 and spring 48, if the inclination of the valve face to the valve axis is changed from 45° to 19° then the fluid flow range in which said approximate straight line relation exists is reduced to 2,000 to 20,000 pounds of fuel per hour. In this later case the departure of the relation between the mass rate of fluid flow and the axial displacement of the valve 32 from a linear relation is greater than with the valve 32 having a 45° face. It is apparent, however, that a more precise linear relationship between said factors could be obtained by modifying the face of the valve from the simple conical surface illustrated.

At this point it should be noted that the small flow of fluid by-passing the valve 32 by flow through the restriction 40, passage 38, duct 42 and nozzle 44 is negligible compared with the total flow through the passage 12.

Because of said straight line relationship between the mass rate of fluid flow through the passage 12 and the axial position of the valve 32 and because the variations in the force exerted by the spring 48 against the lever 46 are proportional to axial movements of the valve it fellows that the torque (T1) exerted by the spring 48 against the lever 46 can be expressed by the equation:

$$T1 = WC1 + C2$$

where W represents the mass rate of fluid flow through the passage, 12, C1 is a constant which includes the spring rate of the spring 48 and the characteristics of the valve 32, and C2 is a constant which results from the force exerted by the spring 48 on the valve 32 when the valve 32 is closed. This torque (T1) on the lever 46 is opposed in part by a constant torque (T2) exerted by the spring 78. The torque T2 can be represented by the equation:

$$T2 = C3$$

where C3 is a constant. In addition the torque T1 is opposed by a torque (T3) exerted by the bellows 56 through the bellcrank lever 58 and pin 74. The torque (T3) can be represented by the equation:

$$T3 = PC4$$

where P is the control fluid pressure in the chamber 54 acting on the bellows 56 and C4 is a constant which includes the moment arms of the pin 74 and bellows 56 on the bellcrank lever 58 and the effective area of the bellows 56 subject to the pressure P.

The lever 46 is subjected to said three torques (T1, T2 and T3) and in response to any unbalance of said torques, the lever pivotally moves to vary the flow resistance of the nozzle 44 so as to effect movement of the main or flow regulating valve 18 to rebalance the torques on said lever. For example, an increase in the control pressure (P) on the bellows 56 produces a corresponding increase in T3 whereupon the lever 46 pivotally moves away from the nozzle 44 to decrease the pressure in the valve actuating bellows 34. This decrease in pressure in the bellows 34 causes the main or regulating valve 18 to move in an opening direction until the increased flow is such that the torque T1 has increased to an extent to rebalance said torques. Thus the lever 46 automatically varies the flow resistance of the nozzle 44 to cause operation of the regulating valve 18 to so control the rate of fluid flow through the passage 12 that the algebraic sum of all the torques acting on the lever 46 is always equal to zero. That is $$T1 - T2 - T3 = 0$$

and therefore $$WC1 + C2 - C3 - PC4 = 0$$

The torque exerted by the spring 78 is adjusted to balance the torque exerted by the spring 48 when the valve 32 is closed so that $$C2 = C3$$

Then $$WC1 = PC4$$

or $$W = KP$$

where K is a combination of C1 and C4 and represents the proportionality constant between W and P. Thus the mass rate of fluid flow through the passage 12 is automatically maintained proportional to the magnitude of the control pressure P. The constant of proportionality K can be changed by angularly adjusting the bellows 56 in the guide slot 62 thereby changing the moment arm of the force exerted by said bellows on the bellcrank lever 58.

Fig. 3 is a schematic view illustrating application of the invention to an aircraft ram jet engine 100 for controlling the rate of fuel supply to the engine in accordance with changes in the impact pressure of the surrounding air relative to the engine. As illustrated, the engine 100 comprises a duct 102 having a rearwardly directed discharge nozzle 104 at its rear end. A centerbody 106 is co-axially supported by struts 108 at the forward end of the duct 102. In addition fuel nozzles 110 are supported in the duct 102 downstream of the centerbody 106 for discharging fuel into the engine combustion chamber 111 within said duct. This fuel mixes and burns with the air entering the duct through its forwardly directed air inlet 112 and the combustion gases discharge rearwardly through the nozzle 104 to provide the engine with forward propulsive thrust. The controls for the ram jet engine are generally mounted within the centerbody 106. Thus the flow regulating device 10 of Fig. 1 is mounted within the center body 106 for controlling the rate of fuel supply to the fuel nozzles 110. In Fig. 3 a passage 114 connects the outlet 16 of the device 10 to the fuel nozzles 110 and the duct 55 opens into the surrounding atmosphere at the forward end of the centerbody 106. With this arrangement of Fig. 3, the chamber 54 of the fuel regulating device 10 is provided with a pressure proportional to the impact pressure of the surrounding air relative to the engine 100 so that said device 10 will automatically vary the rate of fuel supply to the engine combustion chamber 111 in proportion to said impact pressure. As previously stated, it has been found that at least over a limited range of flight speed, the mass air flow into the engine 100 is substantially proportional to the impact pressure of the surrounding air relative to said engine. Accordingly, in Fig. 3 the fuel regulating apparatus will automatically maintain a predetermined fuel-air ratio of the combustion mixture supplied to the combustion chamber 111 over said range of flight speed. This fuel-air ratio can be changed, for example by angularly adjusting the bellows 56 thereby varying the moment arm of the force exerted by the bellows 56 on the bellcrank lever 58 whereby the engine thrust output is changed.

Since the bellows 56 is sealed, the mass rate of fluid flow (W) through the passage 12 is proportional to the absolute value of the control pressure (P) acting on the bellows 56. It may be desired, however, to maintain W proportional to the magnitude of the control pressure (P) above a predetermined datum pressure, as for example the pressure of the surrounding atmosphere. Instead of being sealed, the bellows 56 would then be vented to said pressure datum. Such a modification is illustrated by the partial view of Fig. 4.

The modification of Fig. 4 is identical to Fig. 1 except the control pressure bellows instead of being sealed, is vented to a desired pressure datum. Accordingly those parts of Fig. 4 corresponding to the parts of Fig. 1 have been designated by like reference numerals but with a subscript *a* added thereto. In Fig. 4 the control bellows stem 66*a* has a passage 90 therethrough. The passage 90 communicates with a flexible passage 92 and a conduit 94 to vent the bellows 56*a* to a desired datum pressure, as for example the static pressure of the surrounding atmosphere. Obviously the flow regulating apparatus 10*a* of Fig. 4 may be substituted for the flow regulating apparatus 10 in the fuel regulating jet engine application of the invention illustrated in Fig. 3.

In the device 10, the flow regulating valve 18 is in series with the flow path or passage 12 of the liquid whose flow is to be controlled. It is also possible to control the rate of flow along a path by means of a valve in a by-pass passage. Such a by-pass valve arrangement is essential for example when the liquid whose flow is to be controlled is supplied by a positive displacement type pump such as a gear pump. Fig. 5 illustrates a modification of the flow regulator of Fig. 1 in which the flow regulating valve is disposed in a by-pass passage instead of being in series with the flow path of the liquid whose flow is to be regulated. Obviously the regulator of Fig. 4 may be similarly modified.

In Fig. 5, a liquid flow regulator comprises a housing 210 having a liquid passage 212 therethrough with an inlet 214 and an outlet 216. As illustrated a spur gear type positive displacement pump 218 supplies the liquid to the inlet 214 for flow of said liquid through the passage 212. In order to control the flow through the passage 212 a by-pass passage 220 is provided, said by-pass passage having one end communicating with the inlet 214 and having its other end communicating with a by-pass outlet 222. If the regulator is provided for controlling, for example, the flow of liquid fuel, then the by-pass outlet 222 may be connected to the fuel supply tank for returning the by-passed fuel to said tank.

A flow regulating valve 224 is disposed in the by-pass passage 220 whereby the valve 224 controls the division of flow between the main liquid flow passage 212 and the by-pass passage 220 of the liquid supplied by the pump 218 to the inlet 214. Thus the flow regulating valve 224 is analogous to the flow regulating valve 18 of Fig. 1. It should be noted however that opening movement of the flow regulating valve 224 decreases the flow through the main flow passage 212 instead of increasing said flow as in the case of the valve 18 of Fig. 1. A flow measuring valve 226 is provided in the main passage 212, this latter valve corresponding to the valve 32 of Fig. 1. The flow measuring valve 226 like the valve 32 of Fig. 1 is a poppet-type valve with a conical face engageable with the valve seat 228.

The flow regulating valve 224 is connected to one end of a bellows-type flexible diaphragm 230 connected to the downstream side of said valve. The elasticity of the bellows 230 urges the valve 224 in a closing direction. The interior of the bellows 230 communicates with the inlet 214 at the upstream side of the valve 224 through a restricted passage 232. In addition a passage 234 communicates at one end with the interior of the bellows 230 and at its other end with a restricted nozzle 236 which discharges into the passage 212 downstream of the valve 226.

A lever 238 is pivotally mounted at 239 in the passage 212 with one end of said lever overlying the discharge end of the nozzle 236 to act as a baffle therefor whereby the flow resistance of the nozzle 236 varies with pivotal movements of said lever. A compression spring 240 is interposed between the lever 238 and the measuring valve 226 urging said valve in a closing direction and urging the lever 238 in a direction for opening the nozzle 236.

The force of the spring 240 against the lever 238 is opposed by a fluid pressure force transmitted to said lever by a pin 242 interposed between the lever 238 and a bell crank lever 244 to which one end of a sealed and at least partially evacuated bellows-type flexible diaphragm 246 is pivotally connected at 245. The bellows 246 is disposed in a chamber 248 out of communication with the passage 212 and to which a control fluid pressure is supplied by a duct 250. The bell crank lever 244 is pivotally supported in the bellows chamber 248 at 252. The outer end of the bellows 246 is adjustably connected to an arm 254 in a manner similar to the connection in Fig. 1 of the bellows 56 to the arm 60. The arm 254 has a cylindrical shape co-axial with the pivot axis 245 of the bell crank lever 244 so that the bellows 246 can be angularly adjusted to vary the moment arm of the force exerted by said bellows on the bell crank 244.

The force of the spring 240 against the lever 238 is also opposed by a compression spring 256 one end of which bears against the lever 238 and the other end of which is adjustably anchored to the housing by a screw 258.

With this construction, the operation of the low regulator of Fig. 5 is essentially the same as that of Fig. 1. Thus the spring 240 exerts a torque on the lever 238 which is a linear function of the liquid flow through the passage 212 and this torque is balanced against the constant torque exerted by the spring 256 and by the torque exerted by the pin 242, this latter torque varying in proportion to the control pressure in the bellows chamber 248. The lever 238 is movable in response to any unbalance of said torques to vary the flow resistance of the nozzle 236 thereby varying the pressure in the flow regulating bellows 230 so as to move the regulating valve 224 in a direction to restore said torque balance whereby, as in Fig. 1, the mass rate of flow through the passage 212 is proportional to the magnitude of the control pressure in the chamber 248 and acting on the bellows 246. For example if the control pressure in the chamber 248 increases, the increased torque exerted by this pressure on the lever 238 would cause said lever to pivot counterclockwise (as viewed in the drawing). This pivotal lever movement produces a closing adjustment of the nozzle 236 thereby causing an increase in pressure in the bellows 230 to move the regulating valve 224 in the by-pass passage 220 in a closing direction until the flow through the main passage 212 has increased to such an extent that the torques acting on the lever 238 are again in balance.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Apparatus for regulating the flow of a fluid through a passage; said apparatus comprising means operable to vary said flow; a valve member disposed in said passage and urged in an opening direction by the fluid pressure differential across said valve member, resulting from the fluid flow through said passage, to provide a first force which increases and decreases with increase and decrease respectively in said fluid flow; means providing a second force; means responsive to changes in said forces; and means controlled by said responsive means for effecting operation of said flow varying means such that an increase in said first force and a decrease in said second force both tend to cause a decrease in said flow.

2. Apparatus for regulating the flow of a fluid through a passage; said apparatus comprising means operable to vary said flow; a valve member disposed in said passage and urged in an opening direction by the fluid pressure differential across said valve member, resulting from the fluid flow through said passage, to provide a first force which increases and decreases with increase and decrease respectively in said fluid flow; means providing a control force; a device against which said forces act in opposition, said device being movable in response to unbalance of the forces acting thereon; and means responsive to movement of said device for effecting operation of said flow varying means so as to restore said force balance.

3. Apparatus for regulating the flow of a fluid through a passage; said apparatus comprising means operable to vary said flow; a valve member disposed in said passage and urged in an opening direction by the fluid pressure differential across said valve member resulting from the fluid flow through said passage; spring means for urging said valve member in a closing direction against said fluid pressure differential and providing a spring force which increases and decreases with increase and decrease respectively in said fluid flow; a device subject to said spring force; means subjecting said device to a second force in opposition to said first force, said device being movable in response to unbalance of the forces acting thereon, and means responsive to movement of said device for effecting operation of said flow varying means so as to restore force balance.

4. Apparatus for regulating the flow of a fluid through a passage; said apparatus comprising means operable to vary said flow; a valve member disposed in said passage and urged in an opening direction by the fluid pressure differential across said valve member resulting from the fluid flow through said passage; spring means for urging said valve member in a closing direction against said fluid pressure differential and providing a spring force which increases and decreases with increase and decrease respectively in said fluid flow; means providing a control fluid pressure; means providing a second force which increases and decreases with increase and decrease respectively in said control pressure; a device against which said forces act in opposition, said device being movable in response to unbalance of the forces acting thereon; and means responsive to movement of said device for effecting operation of said flow varying means so as to restore said force balance.

5. Apparatus for regulating the flow of a fluid through a passage; said apparatus comprising a first valve member movable to vary said flow; a second valve member disposed in said passage and urged in an opening direction by the fluid pressure differential across said second valve member resulting from the flow of said fluid through said passage; spring means for urging said second valve member in a closing direction against said pressure differential and providing a spring force which increases and decreases with increase and decrease respectively in said fluid flow; a lever, said spring being operatively connected to said lever for exerting a torque thereon which increases with opening movement of said second valve member; means providing a control pressure; means responsive to said control pressure; means operatively connecting said responsive means to said lever to subject said lever to a torque in a direction opposite to the torque exerted by said spring; and means controlled by pivotal movements of said lever in response to torque unbalance of said lever for effecting opening and closing adjustments of said first valve member in a direction to restore torque balance.

6. Apparatus for controlling the flow of a fluid through a passage from its inlet end to its outlet end; said apparatus comprising means movable for varying the flow through said passage; a movable valve member disposed across said passage, said valve member being urged in an opening direction by the fluid pressure differential across said valve member resulting from fluid flow through said passage; a passageway for bleeding off a portion of the fluid supplied to the inlet of said passage, said passageway having a restricted inlet and a nozzle at its outlet; a lever having a portion overlying the discharge end of said nozzle so that said lever is pivotally movable to vary the pressure in said passageway thereby causing operation of said flow varying means in a flow increasing or in a flow decreasing direction depending on the direction of lever movement; spring means operatively connected between said lever and valve member for urging said valve member in a closing direction and urging said lever in flow decreasing direction; means providing a control pressure; means responsive to said control pressure; and means operatively connecting said control pressure responsive means to said lever for urging said lever in a flow increasing direction.

7. Apparatus as recited in claim 6 in which said valve member is a poppet-type valve having a substantially conical valve-seat-engaging face.

8. Apparatus as recited in claim 6 and including a second spring acting on said lever in opposition to the first-mentioned spring so as substantially to balance the force of said spring on the lever when the flow through said passage is zero.

9. Apparatus for regulating the flow of a fluid through a passage; said apparatus comprising means movable for varying the flow through said passage; a movable valve member disposed across said passage, said valve member being urged in an opening direction by the fluid pressure differential across said valve member resulting from fluid flow through said passage; a passageway having a discharge nozzle in said passage downstream of said valve member and having restricted communication with said passage on the other side of said valve member; means responsive to changes in pressure in said passageway for effecting operation of said flow varying means; a lever having a portion overlying the discharge end of said nozzle so that said lever is pivotally movable to vary the pressure in said passageway thereby causing operation of said flow varying means in a flow increasing or in a flow decreasing direction depending on the direction of lever movement; spring means operatively connected between said lever and valve member for urging said valve member in a closing direction and urging said lever in flow decreasing direction; means providing a control pressure; means responsive to said control pressure; and means operatively connecting said control pressure responsive means to said lever for urging said lever in a flow increasing direction.

10. Apparatus for regulating the flow of a fluid through a passage; said apparatus comprising means movable for varying the flow through said passage; a movable poppet-type valve member disposed across said passage; said valve member being urged in an opening direction by the fluid pressure differential across said valve member resulting from fluid flow through said passage; a passageway having a discharge nozzle in said passage downstream of said valve member and having restricted communication with said passage on the other side of said valve member; means responsive to changes in pressure in said passageway for effecting operation of said flow varying means; a lever having a portion overlying the discharge end of said nozzle so that said lever is pivotally movable to vary the pressure in said passageway thereby causing operation of said flow varying means in a flow increasing or in a flow decreasing direction depending on the direction of lever movement; spring means operatively connected between said lever and valve member for urging said valve member in a closing direction and urging said lever in flow decreasing direction; means providing a control pressure; a flexible diaphragm movable in response to changes in said control pressure; and means operatively connecting said diaphragm to said lever for urging said lever in a flow increasing direction.

11. Apparatus for regulating the flow of a fluid through a passage; said apparatus comprising means movable for varying the flow through said passage; a movable valve member disposed across said passage, said valve member being a poppet-type valve having a conical valve-seat-engaging face and being urged in an opening direction by the fluid pressure differential across said valve member resulting from fluid flow through said passage; a passageway having a discharge nozzle in said passage downstream of said valve member and having restricted communication with said passage on the other side of said valve member; means responsive to changes in pressure in said passageway for effecting operation of said flow varying means; a lever having a portion overlying the discharge end of said nozzle so that said lever is pivotally movable to vary the pressure in said passageway thereby causing operation of said flow varying means in a flow increasing or in a flow decreasing direction depending on the direction of lever movement; spring means operatively connected between said lever and valve member for urging said valve member in a closing direction and urging said lever in flow decreasing direction; means providing a control pressure; means providing a chamber having a passage for connection to said control pressure; a bellows disposed in said chamber, a second lever operatively connected to the first-mentioned lever and pivotally connected to one end of said bellows so that the force of the pressure in said chamber against the bellows is transmitted by the second lever to the first-mentioned lever for urging the first-mentioned lever in a flow decreasing direction; and means for anchoring the other end of said bellows for angular adjustment relative to its pivotal connection to said second lever.

12. Apparatus for regulating the flow of a fluid through a passage; said apparatus comprising a first valve member movable in said passage to vary said flow; a movable poppet-type second valve member disposed in said passage in series with and downstream of said first valve member and urged in an opening direction by the fluid pressure differential across said second valve member resulting from fluid flow through said passage; a passageway having a discharge nozzle in said passage downstream of said second valve member and having restricted communication with said passage upstream of said first valve member; a bellows connected to said first valve member and subject to the pressure in said passageway for urging said first valve member in a closing direction against the fluid pressure upstream of said first valve member; a lever having a portion overlying the discharge end of said nozzle so that said lever is pivotally movable to vary the pressure in said passageway and bellows whereby movement of said lever in a nozzle closing direction produces an increase in said pressure to cause closing adjustment of said first valve member and movement of said lever in a nozzle opening direction produces a decrease in said pressure to cause opening adjustment of said first valve member; spring means operatively connected between said lever and said second valve member for urging said second valve member in a closing direction and urging said lever in a nozzle closing direction; means providing a control pressure; means responsive to said control pressure; and means operatively connecting said control pressure responsive means to said lever for urging said lever in a nozzle opening direction.

13. Apparatus for regulating the flow of a fluid through a first passage; said apparatus comprising a first valve member movable in a by-pass passage for said first passage so that opening and closing movement of said valve member causes a decrease and increase, respectively, in the flow through said first passage; a movable poppet-type second valve member disposed in said first passage and urged in an opening direction by the fluid pressure differential across said second valve member resulting from fluid flow through said first passage; a passageway having a discharge nozzle in said first passage downstream of said second valve member and having restricted communication with said by-pass passage upstream of said first valve member; a bellows connected to said first valve member and subject to the pressure in said passageway for urging said first valve member in a closing direction against the fluid pressure upstream of said first valve member; a lever having a portion overlying the discharge end of said nozzle so that said lever is pivotally movable to vary the pressure in said passageway and bellows whereby movement of said lever in a nozzle closing direction produces an increase in said pressure to cause closing adjustment of said first valve member and movement of said lever in a nozzle opening direction produces a decrease in said pressure to cause opening adjustment of said first valve member; spring means operatively connected between said lever and said second valve member for urging second valve member in a closing direction and urging said lever in a nozzle opening direction; means providing a control pressure; means responsive to said control pressure; and means operatively connecting said control pressure responsive means to said lever for urging said lever in a nozzle closing direction.

14. Apparatus for regulating the rate of supply of fuel to the combustion chamber of an aircraft jet engine having a forwardly directed air inlet and a rearwardly directed nozzle through which the combustion gases discharge for providing the power plant with forward propulsive thrust; said apparatus comprising means operable to vary the rate of fuel flow to the engine combustion chamber; a lever; means for subjecting said lever to a first force which is a measure of said fuel flow; means for subjecting said lever to a second force which is a measure of the impact pressure of the surrounding air relative to the engine, said second force exerting a torque on said lever opposing the torque exerted by said first force on said lever; means for subjecting said lever to a third force which exerts a constant torque on said lever equal but opposite to the torque exerted by said first force when the rate of fuel flow is equal to zero; and means responsive to any unbalance of the torques exerted by said three forces on said lever for effecting operation of said fuel flow varying means so as to rebalance said torques.

15. Apparatus for regulating the flow of a fluid through a passage; said apparatus comprising means operable to vary said flow; a valve member disposed in said passage and urged in an opening direction by the fluid pressure differential across said valve member, resulting from the fluid flow through said passage, to provide a first force which increases and decreases with increase and decrease respectively in said fluid flow; means providing a control fluid pressure; means subject to said control fluid pressure for providing a second force proportional to said control fluid pressure and including means for adjusting the proportionality of said second force and control fluid pressure; means responsive to changes in said forces; and means controlled by said responsive means for effecting operation of said flow varying means such that an increase in said first force and a decrease in said second force both tend to cause a decrease in said flow.

References Cited in the file of this patent

UNITED STATES PATENTS

| | | |
|---|---|---|
| 1,869,144 | Green | July 26, 1932 |
| 2,506,694 | Watson et al. | May 9, 1950 |
| 2,545,703 | Orr | Mar. 20, 1951 |
| 2,545,815 | Klinge | Mar. 20, 1951 |
| 2,579,147 | Ifield | Dec. 18, 1951 |
| 2,581,276 | Mock | Jan. 1, 1952 |
| 2,618,927 | Chandler | Nov. 25, 1952 |
| 2,705,046 | Schroeder | Mar. 29, 1955 |